United States Patent
Parke (10) Patent No.: US 10,343,871 B2
(45) Date of Patent: Jul. 9, 2019

(54) CABLE BLOWING APPARATUS AND METHOD

(71) Applicant: CommScope, Inc. of North Carolina, Hickory, NC (US)

(72) Inventor: Daniel J. Parke, Hickory, NC (US)

(73) Assignee: CommScope, Inc. of North Carolina, Hickory, NC (US)

( * ) Notice: Subject to any disclaimer, the term of this patent is extended or adjusted under 35 U.S.C. 154(b) by 110 days.

(21) Appl. No.: 15/494,445

(22) Filed: Apr. 21, 2017

(65) Prior Publication Data

US 2017/0313544 A1 Nov. 2, 2017

Related U.S. Application Data

(60) Provisional application No. 62/329,161, filed on Apr. 28, 2016.

(51) Int. Cl.
*B65H 54/12* (2006.01)
*B65H 57/18* (2006.01)
(Continued)

(52) U.S. Cl.
CPC .......... *B65H 75/146* (2013.01); *B65H 54/12* (2013.01); *B65H 57/18* (2013.01); *B65H 75/28* (2013.01);
(Continued)

(58) Field of Classification Search
CPC ...... B65H 75/146; B65H 57/18; B65H 57/20; B65H 2701/32
(Continued)

(56) References Cited

U.S. PATENT DOCUMENTS 4,053,118 A 10/1977 Aikins
4,667,896 A 5/1987 Frey et al.
(Continued)

FOREIGN PATENT DOCUMENTS

DE 39 22 974 A1 1/1991
EP 0 420 721 A1 4/1991
(Continued)

OTHER PUBLICATIONS

Machine Translation of EP 0 551 786 A1, Jul. 21, 1993. (Year: 1993).*

*Primary Examiner* — William E Dondero
(74) *Attorney, Agent, or Firm* — Muncy, Geissler, Olds & Lowe, P.C.

(57) ABSTRACT

A method and reel design enables blowing cable from a reel into a mid-span access point within a cable conduit. The cable reel includes a central hub, a first flange located proximate one edge of the central hub, a second flange located proximate an opposite, second edge of the hub, and a third flange located between the first and second flanges. A continuous communications cable has first and second portions spooled on first and second reel sections. The technician inserts a first end of the communications cable into a mid-span opening in the conduit, so that the first end of the communications cable is directed toward the first end of the conduit. The first portion of cable is blown off of the first reel section. The technician inserts a second end of the communications cable into the opening in the conduit so that the second end of the communications cable is directed toward the second end of the conduit. The second portion of cable is blown off of the second reel section. Then, a mid-portion of the communications cable is separated from the third flange of the cable reel and resides proximate the opening in the conduit.

19 Claims, 12 Drawing Sheets

(51) Int. Cl.
  *B65H 75/14*   (2006.01)
  *B65H 75/28*   (2006.01)
  *G02B 6/44*    (2006.01)
  *H02G 1/08*    (2006.01)

(52) U.S. Cl.
  CPC ......... *G02B 6/4457* (2013.01); *G02B 6/4463* (2013.01); *H02G 1/086* (2013.01); *B65H 2701/32* (2013.01)

(58) Field of Classification Search
  USPC ....................................................... 242/566
  See application file for complete search history.

(56) References Cited

U.S. PATENT DOCUMENTS

| | | |
|---|---|---|
| 4,783,054 A | 11/1988 | Morel et al. |
| 4,990,033 A | 2/1991 | Handley et al. |
| 5,114,091 A | 5/1992 | Peterson et al. |
| 5,186,406 A | 2/1993 | Romanelli |
| 5,230,481 A | 7/1993 | Wheeler et al. |
| 5,308,041 A | 5/1994 | Griffioen et al. |
| 5,813,658 A | 9/1998 | Kaminski et al. |
| 5,992,787 A | 11/1999 | Burke |
| 6,170,804 B1 | 1/2001 | Allen |
| 6,715,710 B1 | 4/2004 | Russell et al. |
| 7,017,846 B2 | 3/2006 | Tsoi et al. |
| 8,374,475 B2 | 2/2013 | Griffioen et al. |
| 8,474,742 B2 | 7/2013 | Smrha |
| 8,891,931 B2 | 11/2014 | Kowalczyk et al. |
| 9,042,700 B2 * | 5/2015 | Smith ................ B65H 75/146 385/135 |
| 9,555,999 B2 * | 1/2017 | Smith ................ B65H 75/146 |
| 9,745,166 B2 * | 8/2017 | Shirako .............. G02B 6/4457 |
| 10,124,984 B1 * | 11/2018 | Garvie ............... B65H 75/146 |
| 2008/0011990 A1 | 1/2008 | Kostet et al. |
| 2012/0025005 A1 * | 2/2012 | Smith ................ B65H 75/146 242/603 |
| 2013/0306781 A1 * | 11/2013 | Tong ................. B65H 75/146 242/388.1 |
| 2016/0155553 A1 * | 6/2016 | Hayashi ............. H01F 5/02 335/299 |
| 2017/0320699 A1 * | 11/2017 | Smith ................ B65H 75/146 |

FOREIGN PATENT DOCUMENTS

| | | | | |
|---|---|---|---|---|
| EP | 0551786 A1 | * | 7/1993 | ............. B65H 54/00 |
| FR | 2 653 946 A1 | | 5/1991 | |
| JP | 08301534 A | * | 11/1996 | ............. B65H 57/18 |
| WO | WO 2013-044100 A1 | | 3/2013 | |
| WO | WO-2015030188 A1 | * | 3/2015 | ........... G02B 6/4457 |

* cited by examiner

CABLE BLOWING APPARATUS AND METHOD

This application claims the benefit of U.S. Provisional Application No. 62/329,161, filed Apr. 28, 2016, which is herein incorporated by reference.

BACKGROUND OF THE INVENTION

1. Field of the Invention

The present invention relates to air blowing cable into a conduit. More particularly, the present invention relates to devices and methods to improve the process of paying out cable for blowing into a conduit. In one embodiment, the device and method enables blowing a first cable end into a mid-portion of a conduit in a first direction and blowing a second cable end of the same cable into the mid-portion of the conduit in a second, opposite direction. In another embodiment, the device and method enable faster loading of a cable into a fleeter.

2. Description of the Related Art

It is generally known in the existing arts, that a cable may be inserted into a conduit by inserting an end of the cable into a first end of a conduit and using air flow to move the cable into the conduit and bring the first end of the cable out of a second, opposite end of the conduit. A device used to hold the cable prior to installation in the conduit and to feed the cable to a blower to install the cable into the conduit is commonly called a fleeter. See for example, U.S. Pat. Nos. 4,783,054; 4,990,033; 5,308,041; and 5,813,658, as well as U.S. Published Application 2008/0011990, all of which are wherein incorporated by reference.

Prior to inserting the cable into the conduit, the cable must be organized to be paid out by the fleeter. One known method is to take a cable on a reel, support the reel on the ground with a stand having a spindle inserted into a middle hole of the reel, so that the cable can be paid off of the reel as the reel rotates on the spindle. Insert one end of the cable into a cable blowing machine, and blow the entire cable into a collection vessel of the fleeter. The collection vessel may be a wire basket which collects the cable into the interior of the basket in overlapping figure eight patterns. Once the cable is entirely blown into the collection vessel of the fleeter, the other, opposite end of the cable is feed into the blower and the cable is blown from the collection vessel of the fleeter into a conduit opening.

The above method illustrates one known method for installing a cable run into a conduit. The length of cable that can be installed using such a method is limited. The length of cable is limited by factors such as the cable diameter, cable weight per foot, cable flexibility, the coefficient of friction between the jacket of the cable and the conduit walls, etc. In other words, at some point the cable blowing machine will no longer be able to push a birdie attached to the cable end any further down a conduit. If the maximum push length for the cable is less than the conduit length, the installation process is a failure, as the cable end did not reach the other end of the conduit, and the cable must be manually pulled back out of the conduit. Sometimes, a retrieval line is attached to the birdie, so that the retrieval line can be pulled along with the cable, so that excessive force is not applied to the cable to pull the birdie back through the conduit. Essentially, the retrieval line pulls the birdie and the pull force on the cable is only sufficient to pull out the slack in the cable, as the birdie is pulled back out of the conduit.

Figure 1:
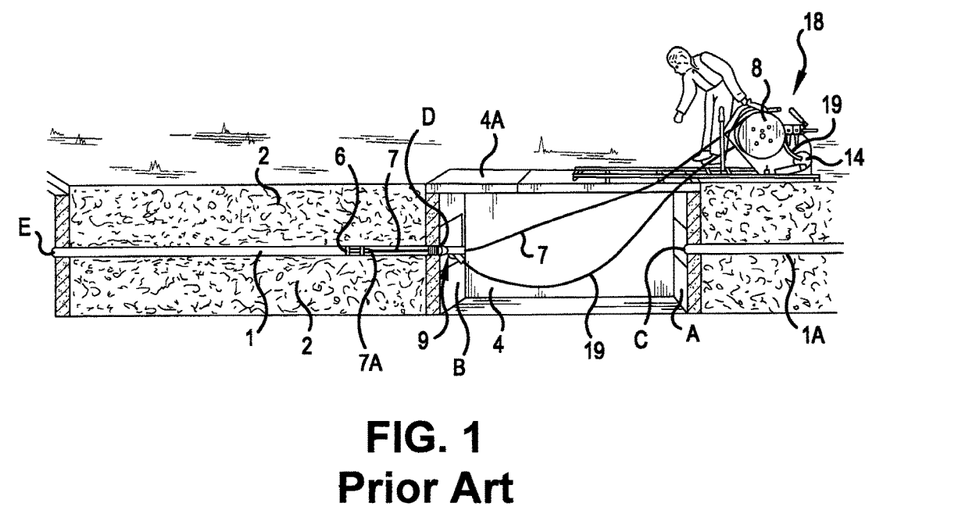
FIG. 1 is a cross sectional view of an initial stage of a blowing operation for mid-span access to a conduit, in accordance with the prior art.
Figure 2:
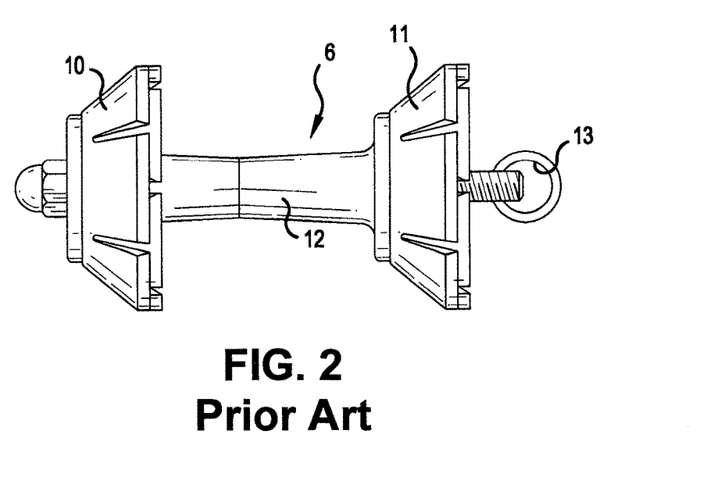
FIG. 2 is a side view of a birdie used in the operation of FIG. 1.

One known method to blow a continuous cable through a conduit which exceeds the maximum push length of a fleeter's blower, is to use a mid-span access technique. In a mid-span access, the conduit is cut in a mid-section thereof. A first cable end is blown into a mid-portion of a conduit in a first direction and a second cable end of the same cable is blown into the mid-portion of the conduit in a second, opposite direction The mid-span access is illustrated with reference to FIG. 1. In FIG. 1, a conduit is open mid-span, inside of a manhole 4 to form two conduit sections. A reel 8 supports cable 7. Rotation of the reel 8 pays the cable 7 off of the reel 8. A first end 7A of the cable 7 is attached to a ring 13 of a birdie 6 (FIG. 2). A retrieval line (not shown) may also be attached to the ring 13.

The birdie 6 has gaskets 10 and 11 spaced along a spine 12. The birdie 6 is inserted into an opening D of a first section of conduit 1 buried in the ground 2. The opening D may exist on a first wall B of the manhole 4. The gaskets 10 and 11 make close contact with the inner wall of the conduit 1, so that air does not easily pass by the gaskets 10 and 11, but rather pushes the birdie 6 down the conduit 1.

A technician operates a controller for a blower 14 of a fleeter 18. The blower 14 supplies air via a hose 19 to a head unit 9. The head unit 9 has the cable 7 passing therethrough and is sealed to the end D of the first section of the conduit 1. The blower 14 causes the birdie 6 to travel to the other end E of the first section of the conduit 1, e.g., into a basement of a building or into another manhole.

Figure 3:
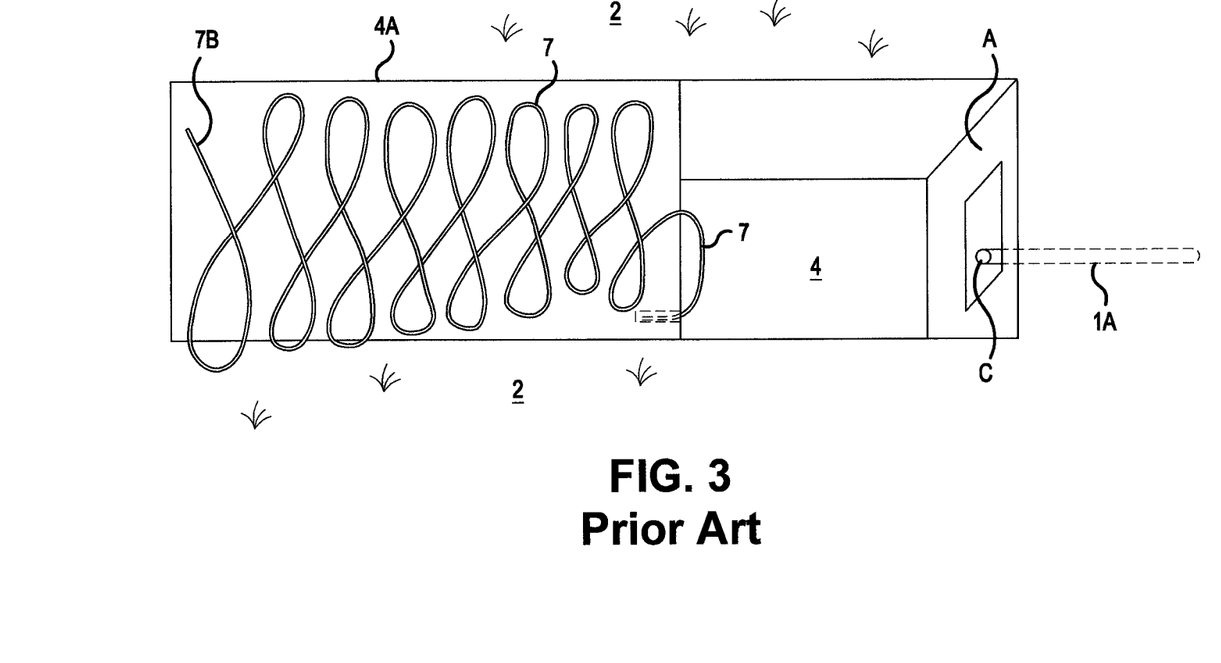
FIG. 3 is a top view of a middle stage of the blowing operation for mid-span access to the conduit, in accordance with the prior art.

Once the birdie 6 exits the other end E of the first section of the conduit 1, the birdie 6 is removed from the first end 7A of the cable 7. At this point, approximately half of the length of cable 7 still resides on the reel 8. The technician unspools the remaining cable 7 onto a platform 4A of the manhole 4, so as to gain access to the opposite, second end 7B of the cable 7. The unspooled cable is typically placed on the platform 4A in overlapping figure eight patterns, as best seen in FIG. 3.

The second end 7B of the cable 7 is attached to the birdie 6. The birdie 6 is manually inserted into an opening C of a second section of the conduit 1A (See FIGS. 1 and 3). The opening C may be formed in a second wall A of the manhole 4. The head unit 9 is removed from the opening D for the first section of the conduit 1, assembled over the cable 7 and attached to the opening C of the second section of the conduit 1A. Then, the technician operates the fleeter 18 to blow the second end 7B of the cable 7 out the end of the second section of the conduit 1A, e.g., into a basement of a building, a telecommunications cabinet, another manhole.

As the birdie 6 travels down the second section of the conduit 1A, the figure eight loops pay off of the platform 4A. In the end, the continuous cable 7 extends between the first and second sections of conduit 1 and 1A, and the cable did not need to be spliced inside of the manhole 4, which eliminates a potential splice failure point in the cable run, saves splicing time, and eliminates the need for a splice housing inside the man hole 4.

Although the above description has detailed a birdie 6 used with an air blower 14, it is also possible to not use a birdie 6. The cable 7 may be pushed into the first and/or second sections of conduit 1 and/or 1A using capstan rollers. Air pressure may be applied in conjunction with the capstan rollers, without the use of a birdie 6.

SUMMARY OF THE INVENTION

Applicant has appreciated some drawbacks in the background art. In the first described method, it takes time to blow a cable off of a reel and into a collection vessel of a fleeter. In the second described method, placing the cable 7 on the platform 4A exposes the cable 7 to dirt, water and other contaminants. Such contaminants can remain on the jacket of the cable 7 and be introduced into the second section of the conduit 1A, and may cause a failure in the blowing operation.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limits of the present invention, and wherein.

DETAILED DESCRIPTION OF EMBODIMENTS OF THE INVENTION

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity. Broken lines illustrate optional features or operations unless specified otherwise.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Figure 4:
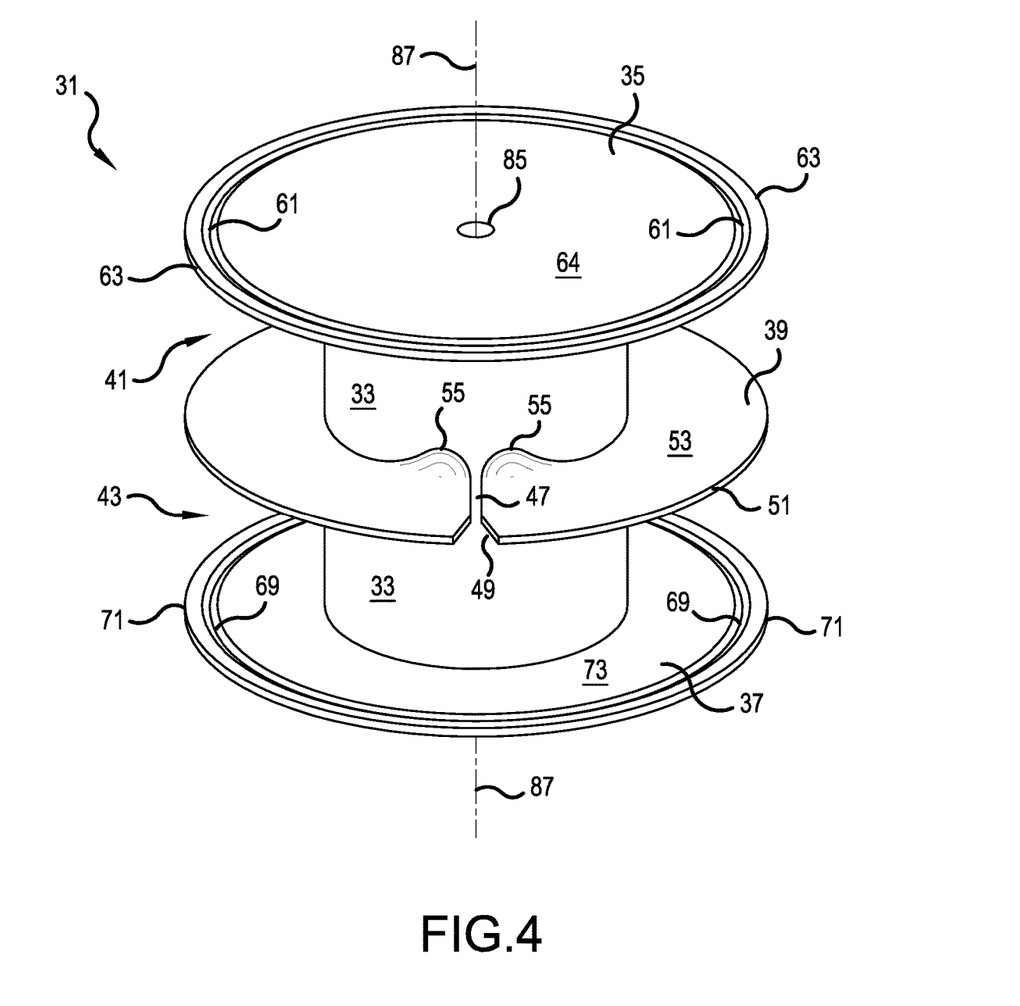
FIG. 4 is a top perspective view of a cable reel, in accordance with the present invention.
Figure 5:
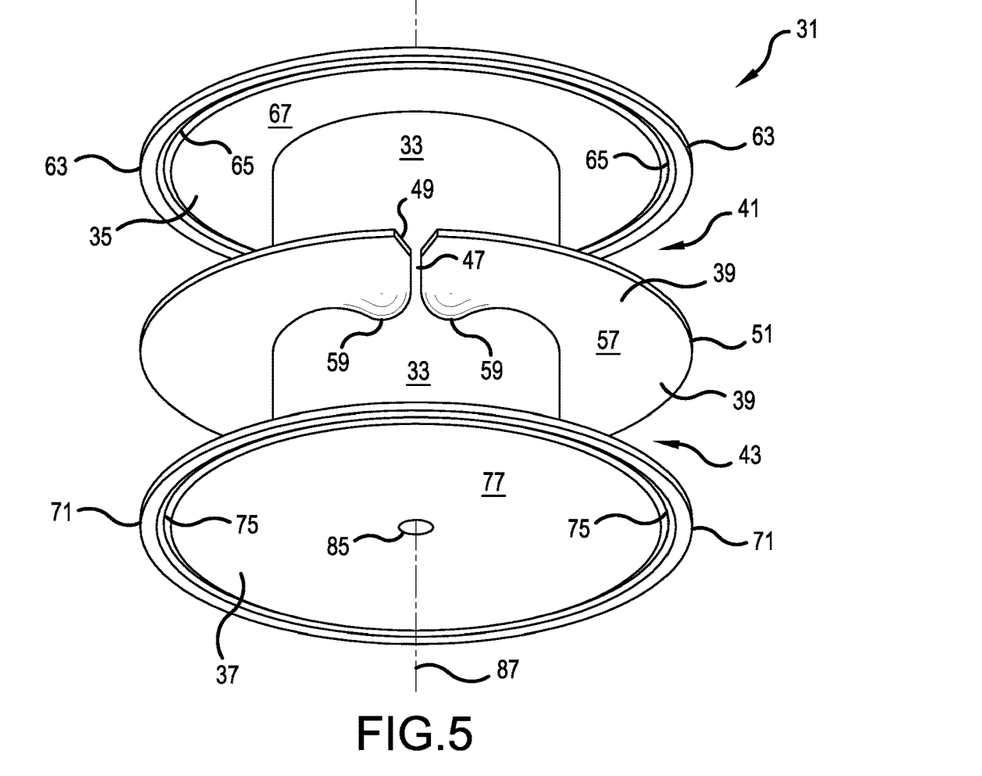
FIG. 5 is a bottom perspective view of the cable reel of FIG. 4.
Figure 6:
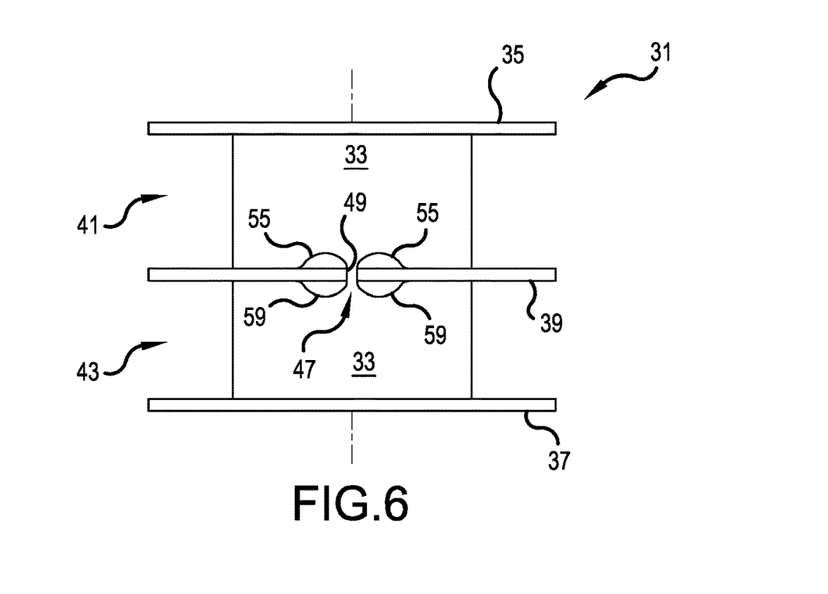
FIG. 6 is a side view of the cable reel of FIGS. 4 and 5.

FIG. 4 is a top perspective view of a cable reel 31, in accordance with the present invention. FIG. 5 is a bottom perspective view of the cable reel 31, and FIG. 6 is a side view of the cable reel 31.

The cable reel 31 includes a central hub 33. A first flange 35 is located proximate one edge of the central hub 33. A second flange 37 is located proximate an opposite, second edge of the central hub 33. A third flange 39 is located between the first flange 35 and the second flange 37.

Figure 7:
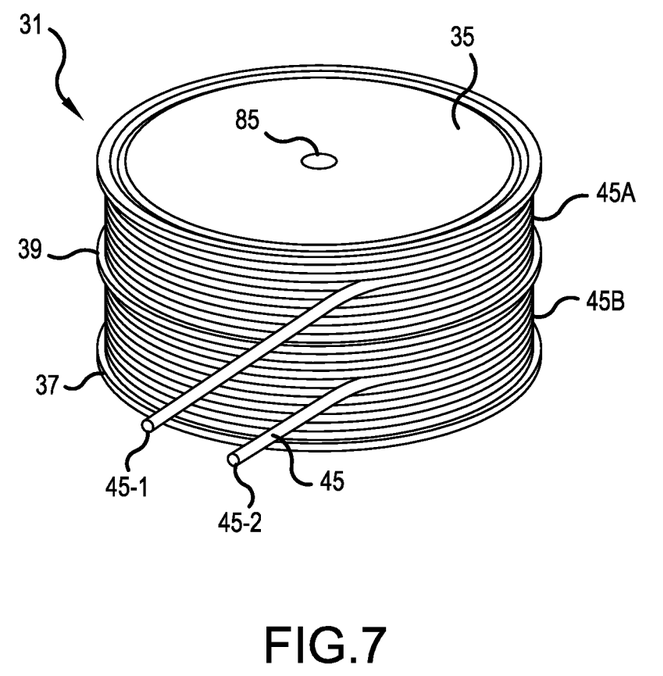
FIG. 7 is a top perspective view of the cable reel of FIG. 4-6 with a continuous cable wound thereon.

A first reel section 41 is formed between the first flange 35 and the third flange 39. A second reel section 43 is formed between the second flange 37 and the third flange 39. As best illustrated in FIG. 7, a continuous communications cable 45 having a first end 45-1 and a second end 45-2 has a first portion 45A spooled on the first reel section 41 and a second portion 45B spooled on the second reel section 43.

Figure 10:
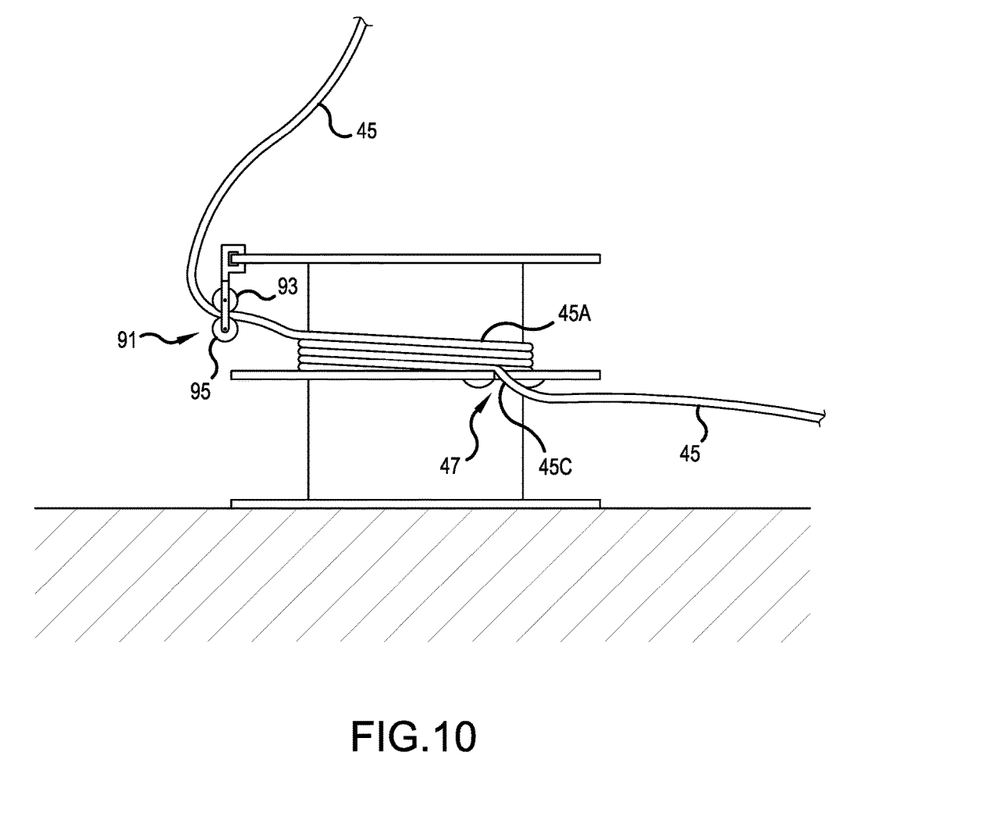
FIG. 10 is a side view of the cable reel of FIG. 8, with the first portion of the cable completely spooled off and the second portion of the cable almost completely spooled off, and illustrating an optional over-the-flange guide.

Referring back to FIGS. 4-6, a passageway 47 is formed in the third flange 39 and a central segment 45C of the continuous cable 45 passes through the passageway 47 (see FIG. 10). Preferably, the central segment 45C of the continuous cable 45 is located proximate a mid-portion of a length of the continuous cable 45.

The passageway 47 is formed as a slot extending from a portion of said third flange adjacent to the central hub 33 to an opening 49 in an outer periphery 51 of the third flange 39. The opening 49 may optionally be larger than the passageway 47 and funnel down to the passageway 47 to better facility loading the central segment 45C of the continuous cable 45 into the passageway 47.

A first side 53 of the third flange 39 may include first bulbous curved portions 55 adjacent to both side edges of the passageway 47. Likewise, a second side 57 of the third flange 39 may include second bulbous curved portions 59 adjacent to both side edges of the passageway 47. The first and second bulbous curved portions 55 and 59 act as bend limiters. If the continuous cable 45 is of the fiber optic type, it will typically have a specified minimum bend radius, such that the fibers therein are not damaged. By providing the first and second bulbous curved portions 55 and 59, the sharp ninety degree angle between the passageway 47 and the first or second sides 53 or 57 of the third flange 39 will not act directly on the continuous cable 45, which could cause a micro-bend in the cable with a radius less than the minimum bend radius of the continuous cable 45.

As best seen in FIG. 4, an outer edge of the first flange 35 includes a first track feature. In a preferred embodiment, the first track feature is a first groove 61 concentrically formed just inside an outer periphery 63 of the first flange 35 on a first side 64 of the first flange 35 and a second groove 65 (See FIG. 5) concentrically formed just inside the outer periphery 63 of the first flange 35 on a second side 67 of the first flange 35.

As best seen in FIG. 4, an outer edge of the second flange 37 includes a second track feature. In a preferred embodiment, the second track feature is a third groove 69 concentrically formed just inside an outer periphery 71 of the second flange 37 on a first side 73 of the second flange 37 and a fourth groove 75 (See FIG. 5) concentrically formed just inside the outer periphery 71 of the second flange 37 on a second side 77 of the second flange 37.

Figure 8:
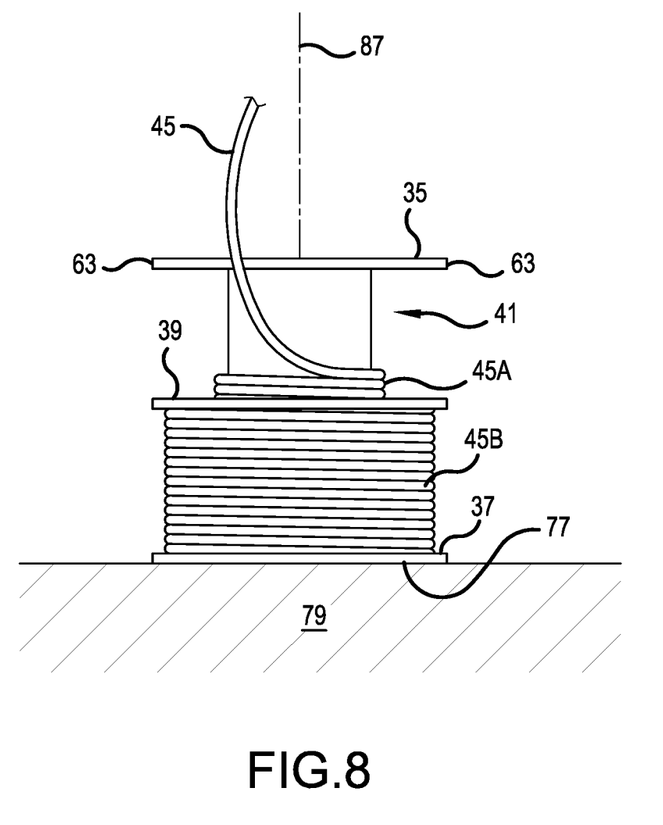
FIG. 8 is a side view of the cable reel of FIG. 7 configured in a first manner for unspooling, and with a first portion of the cable almost completely spooled off of a first reel section and a second portion of the cable completely wound on a second reel section.

Now, with reference to FIG. 8, a first general method of blowing the cable 45 into a mid-span access with two facing ends of a conduit will be explained. The cable reel 8 of FIG. 1 is replaced with the cable reel 31 of the present invention. In one embodiment, the second side 77 of the second flange 37 of the cable reel 31 is rested on the ground 79, as shown in FIG. 8. The first end 45-1 is fed to the head unit 9 of FIG. 1 attached to the opening D of the first section of conduit 1, and the first portion 45A of the cable 45 is paid over-the-flange. In other words, the first portion 45A of the cable 45 is looped over the outer periphery 63 of the first flange 35 in a rotating manner, as the cable reel 31 sits stationary on the ground 79. After the first portion 45A of the cable 45 is completed paid off of the first reel section 41, the cable reel 31 is flipped over and the first side 64 of the first flange 35 is rested upon the ground 79. The second end 45-2 of the second portion 45B of the cable 45 is fed to the head unit 9 and the head unit 9 is moved over the opening C of the second section of conduit 1A. Then, the second portion 45B of the cable 45 is paid over-the-flange in a similar manner.

Figure 9:
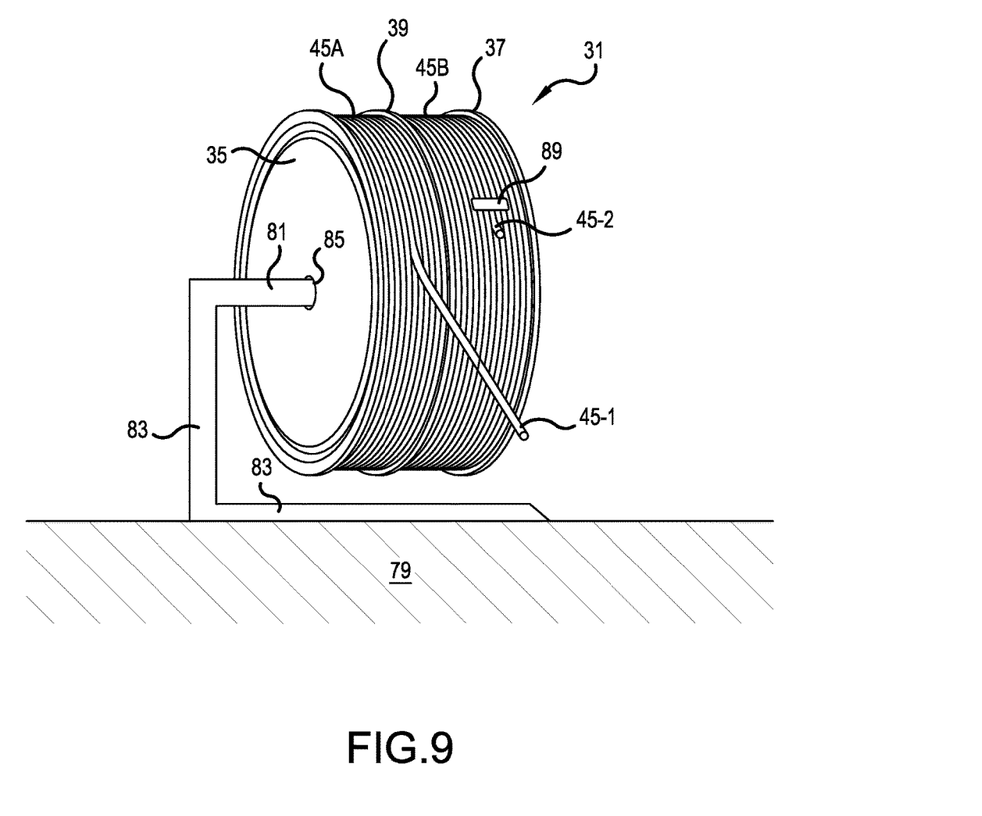
FIG. 9 is a side perspective view of the cable reel of FIG. 7 configured in a second, alternative manner for unspooling, and with both the first and second portions of the cable wound on the first and second reel sections, respectively.

FIG. 9 illustrates a modified method of employing the cable reel 31. Instead of resting the second side 77 of the second flange 37 of the cable reel 31 on the ground 79, a spindle 81 of a stand 83 is inserted into a hole 85 disposed along a central axis 87 of the cable reel 31. The second end 45-2 is secured down to the second portion 45B of the cable 45, such as by a piece of tape 89, a shrink wrap, a sock, a hook and loop strap, etc.

In the configuration of FIG. 9, the cable reel 31 can rotate about the spindle 81 to pay off the first portion 45A of the cable 45 to the head unit 9. Rotation of the cable reel 31 will not cause the second portion 45B of the cable 45 to unwind from the cable reel 31 due to the piece of tape 89. After the first portion 45A is completed unspooled, the second end 45-2 of the cable is fed to the head unit 9.

The second portion 45B may not be unspooled using the spindle 81 because further rotation of the cable reel 31 about the spindle 81 will cause the first section 45A of the cable 45 to be spooled back onto the first reel section 41 of the cable reel 31. Rather, the cable reel 31 is removed from the spindle 81 and the first side 64 of the first flange 35 is rested upon the ground 79 and the second portion 45B of the cable 45 is unspooled using the over-the-flange technique of FIG. 8. Once the second portion 45B of the cable 45 is completely paid off of the second reel section 43 of the cable reel 31, the central segment 45C of the cable 45 is removed from the passageway 47.

Figure 11:
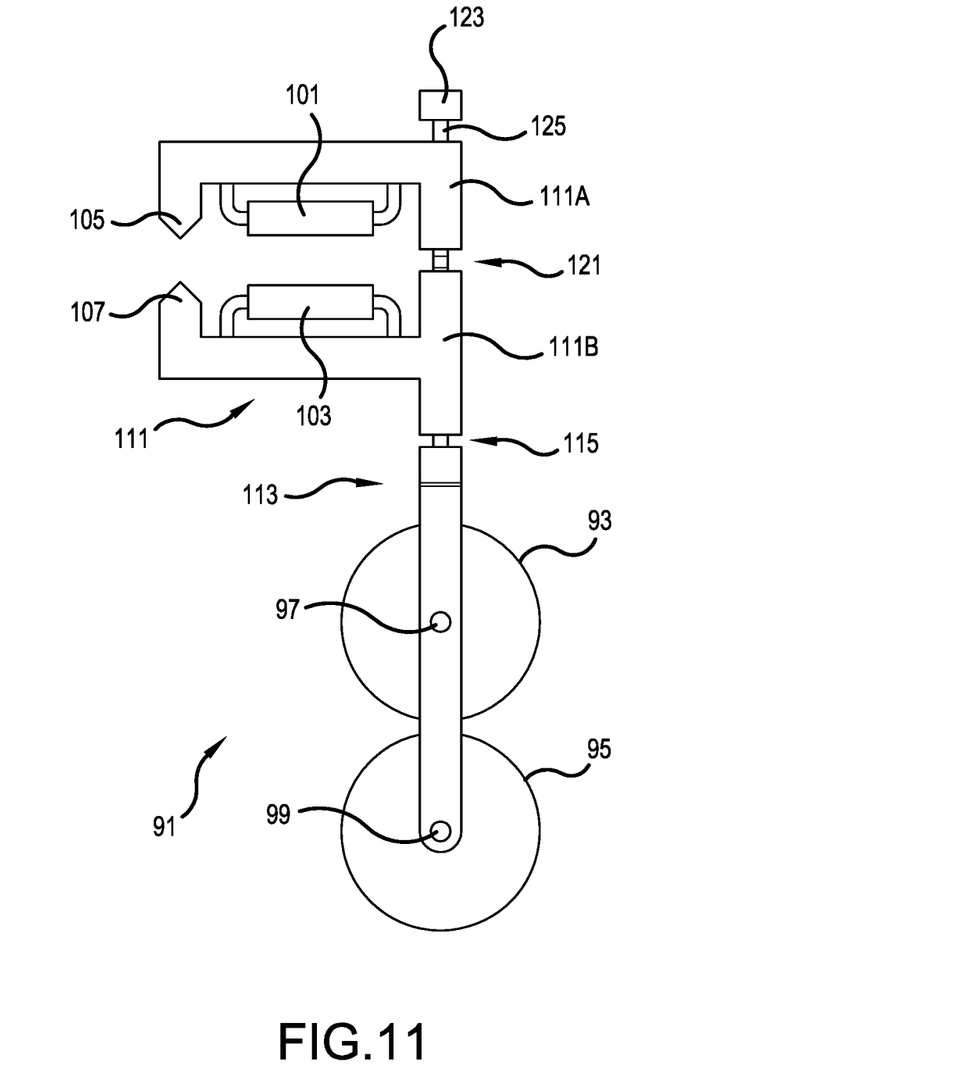
FIG. 11 is a close-up side view of the over-the-flange guide of FIG. 10.
Figure 12:
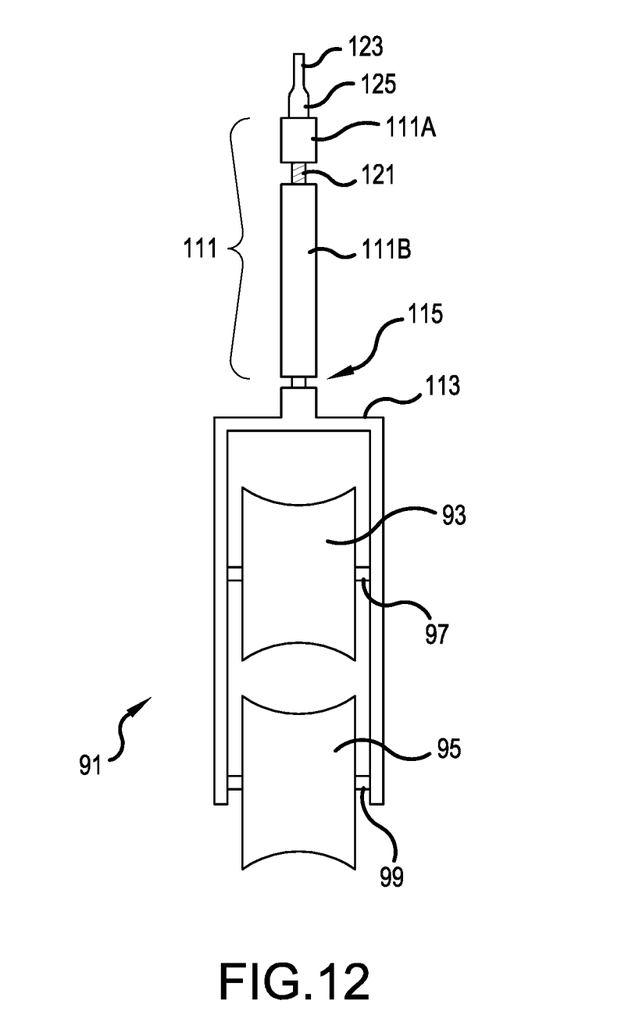
FIG. 12 is as end view of the over-the-flange guide of FIG. 11.

An over-the-flange guide 91, which can assist in the over-the-flange pay off technique is illustrated in FIGS. 10-12. The over-the-flange guide 91 is removably connected to either the first and second grooves 61 and 65 of the first track feature and can move around the outer periphery 63 of the first flange 35, or to the third and fourth grooves 69 and 75 of the second track feature and can move around the outer periphery 71 of the second flange 37.

The over-the-flange guide 91 includes first and second wheels 93 and 95 supported on first and second wheel axles 97 and 99, respectively. The continuous communications cable 45 passes over at least one of the first and second wheels 93 and 95. More particularly, the first wheel 93 faces to the second wheel 95, and the continuous communications cable 45 passes between the first and second wheels 93 and 95.

The over-the-flange guide 91 includes first and second rollers 101 and 103. When the over-the-flange guide 91 is attached to the first flange 35, the first roller 101 rolls along the first side 64 of the first flange 35 proximate the outer periphery 63 of the first flange 35, and the second roller 103 rolls along the second side 67 of the first flange 35 proximate the outer periphery 63 of the first flange 35. When the over-the-flange guide 91 is attached to the second flange 37, the first roller 101 rolls along the second side 77 of the second flange 37 proximate the outer periphery 71 of the second flange 37, and the second roller 103 rolls along the first side 73 of the second flange 37 proximate the outer periphery 71 of the second flange 37.

The over-the-flange guide 91 includes first and second projecting features 105 and 107. When the over-the-flange guide 91 is attached to the first flange 35, the first projecting feature 105 extends into the first groove 61 of the first side 64 of the first flange 35, and the second projecting feature 107 extends into the second groove 65 on the second side 67 of the first flange 35. When the over-the-flange guide 91 is attached to the second flange 37, the first projecting feature 105 extends into the fourth groove 75 of the second side 77 of the second flange 37, and the second projecting feature 107 extends into the third groove 69 on the first side 73 of the second flange 37. The first and second projecting features 105 and 107 may be formed with a shape complimentary to the shapes of the first, second, third and fourth grooves 61, 65, 69 and 75. For example, the first and second projecting features 105 and 107 may be formed with V-shaped peaks and the first, second, third and fourth grooves 61, 65, 69 and 75 have a v-shaped valleys.

The first and second projecting features 105 and 107 and the first and second rollers 101 and 103 are attached to a first frame section 111. The first and second wheels 93 and 95 and first and second axles 97 and 99 are attached to a second frame section 113. The first frame section 111 may be attached to the second frame section 113 by a freely rotatable joint 115, which allows the second frame section 113 to freely swivel relative to the first frame section 111.

To attach the first and second projecting features 105 and 107 into the first, second, third and fourth grooves 61, 65, 69 and 75, the first frame section 111 may be formed with an upper part 111A and a lower part 111B. The upper part 111A and the lower part 111B may be attached with a threaded faster 121. The threaded fastener 121 has a head 123 at one end which can be turned by a user's fingers. A portion 125 just below the head 123 has no threads and extends through and is captured within the upper part 111A. The lower end of the threaded fastener 121 has threads and is engaged within mating threads in a bore of the lower part 111B. Rotation of the head 123 causes the spacing between the first and second projecting features 105 and 107 to be user set. Therefore, the spacing may be initially set at a large distance to allow the first or second flange 35 or 37 to pass between the first and second projecting features 105 and 107. Then, the user may turn the head 123 to reduce the spacing between the first and second projecting features 105 and 107, so as to engage the first and second projecting features 105 and 107 into the first and second grooves 61 and 65 of the first flange 35, or into the fourth and third grooves 75 and 69 of the second flange 37, as the case may be.

The over-the-flange guide 91 easily travels around the outer peripheries 63 or 71 of the first or second flanges 35 or 37. The over-the-flange guide 91 reduces the friction of the cable jacket on the side edges of the first and second flanges 35 and 37. Also, the first and second wheels 93 and 95 may be selected to a have a radius larger than the specified minimum bend radius of the cable 45 being been deployed over-the-flange. Therefore, potentially damaging micro-bends, which might occur as the cable 45 passes directly over the flange's edge, may be avoided.

As a summary to the mid-span conduit blowing technique, in the background art, sometimes installers choose to install from the midpoint of a cable run. This allows the installer to blow twice the length of cable into a duct system without having to cut or splice the cable. The typical practice is to have a break in the duct or conduit at the midpoint of the total continuous run length (L). The installer will blow from the midpoint into the right half of the run (L/2) from the top half of the cable reel. This will leave (L/2) length of cable on the reel. In order for the installer to blow the other half of the cable remaining on the reel without cutting the cable the installer will pull the remaining length of cable from the reel and stack it in figure eight loops on the ground. This is done to get to the bottom or inside end of the cable. Once the installer gets to the other end of the cable, they can blow the left half of the run (L/2) into the duct.

Pulling the second half of the cable from the reel and looping it on the ground has many disadvantages including, but not limited to, extra labor, exposure to the ground, and exposure to possible damage during the process. The present invention would eliminate the step of pulling the second half of cable and stacking it on the ground. The present invention relates to a new type of reel that allows the installer access to both ends of the cable.

The reel would have an extra flange in the middle of the reel dividing the width of the reel in half. The cable manufacturer would accumulate L/2 length of cable and the middle flange would have a slit cut into it that would allow the cable manufacturer to stick the midpoint of the continuous length L of cable into the slit. The slit would hold the midpoint of the cable and allow the takeup to parallel wind the accumulated length of cable on the right side of the middle flange at the same time the remaining half length of cable still being jacketed would be winding up on the left side of the middle flange.

This parallel winding would continue with two separate feeding systems for each section of the reel. Since the cable winding was started at the midpoint of the continuous length L, the reel would be complete when L/2 length was wound on each half of the reel. The reel could then be shipped to the customer for installation.

Figure 12A:
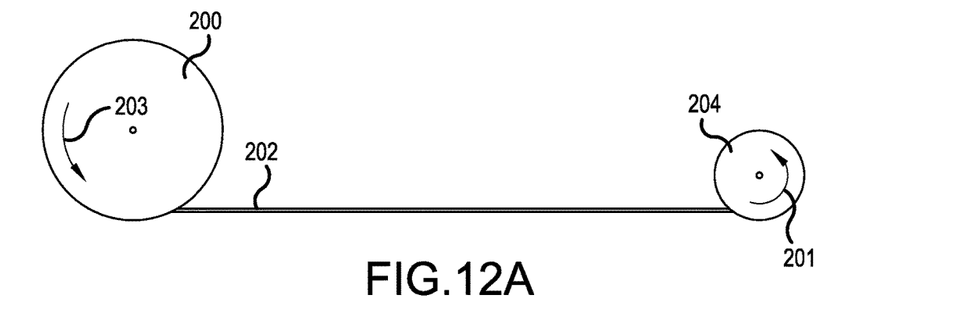
FIG. 12A is a diagram showing the beginning of a process to load cable onto the reel of FIGS. 4-6.

Although the above method has been described as occurring during the cable manufacturing process, e.g., the jacketing process, the method could also be performed on a previously manufactured cable wound on a conventional large reel. For example, with reference to FIG. 12A, a conventional large reel 200, e.g., a storage reel, may have a long length of cable 202 wound thereon, e.g., a length of 10L. As the large reel 200 is conventional, only a first end of the cable 202 is available, as the second end of the cable 202 is located at a hub of the large reel 200 and covered by the numerous windings of the cable 202. The first end of the cable 202 is loaded onto a hub of a conventional small reel 204, e.g., a take-up reel, and a length of almost L/2 of the cable 202 is wound onto the small reel 204, e.g., a length of L/2 minus ten feet of cable. The cable 202 may be transferred by driving the small reel 204 to rotate in the direction of arrow 201, while allowing the large reel 200 to freely rotate in the direction of arrow 203. Then, the reeling action is stopped.

Figure 12B:
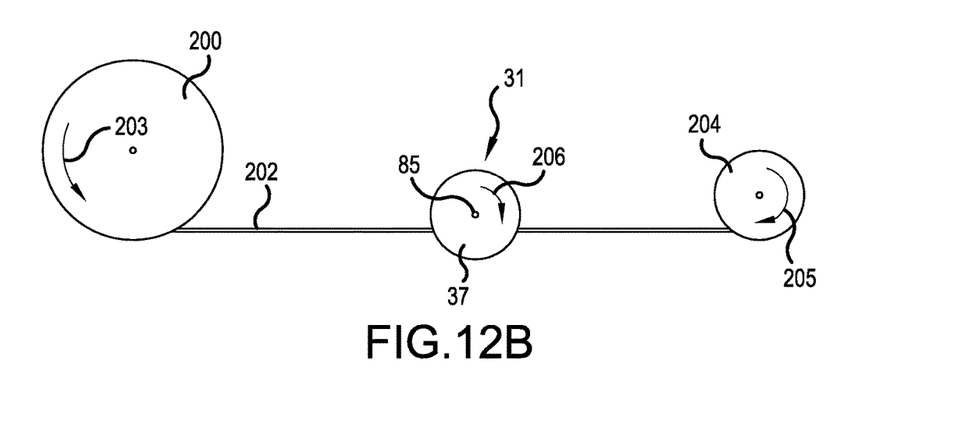
FIG. 12B is a diagram the process of loading cable onto the reel of FIG. 4-6.

At a point along the length of the cable 202 between large reel 200 and the small reel 204, e.g., ten feet from the small reel 204, the cable 202 is loaded into the passageway 47 of the third flange 39 of the reel 31 of the present invention. See FIG. 12B. The reel 31 is driven to rotate in the direction of arrow 206, while the large reel 200 and the small reel 204 are allowed to freely rotate in the directions of arrows 203 and 205, respectively. Once the entirety of the cable 202 on the small reel 204 is wound onto the first reel section 41 of the reel 31, the driven rotation of the reel 31 is stopped. At that time, a length of L/2 of cable 202 from the small reel 204 will be wound within the first section 41 of the reel 31, and a length of L/2 of the cable 202 from the large reel 200 will be wound within the second reel section 43 of the reel 31. The cable 202 is then cut, and the reel 31 may be packaged and shipped to a customer. The 9L length of cable 202 remaining on the large reel 200 may be then feed over to the small reel 204 and wound thereon, as the process is repeated.

The installation process would be different than a normal reel. In one embodiment, the reel would not be spun to remove the cable. Instead the cable would be looped off over the outside flange. This could be done by laying the reel on its flange, or the reel could be mounted by its center flange allowing access to loop the cable over the outer flange. The installer could loop the right half of the reel into the right duct and then loop the left half of the reel into the left duct. There are commercially available devices that assist with paying cable off over the side of the reel or the over-the-flange guide 91 of FIGS. 10-12 may be used. This invention allows the entire length of cable to be installed without looping the bottom half onto the ground before installing it.

Figure 13:
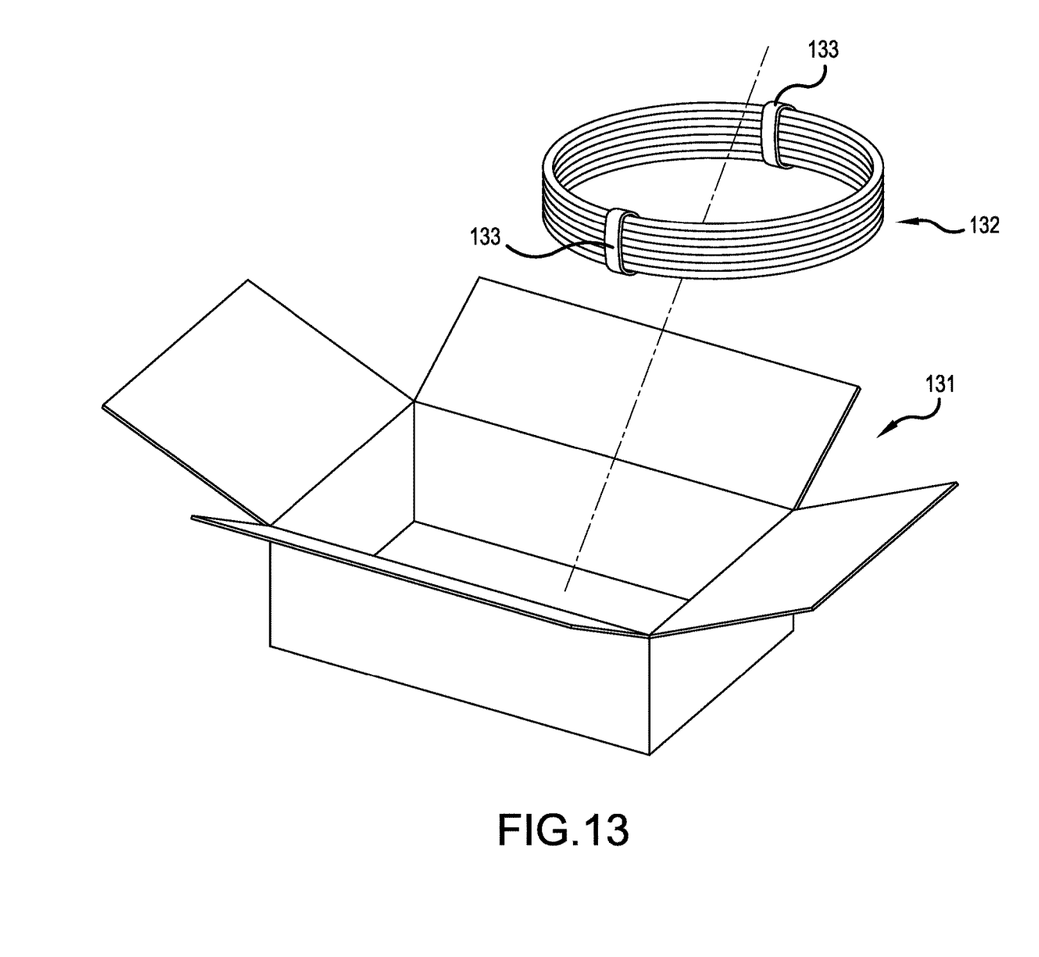
FIG. 13 is a perspective view of a packaged coil of cable, in accordance with a second embodiment of the present invention.

In the situation where a cable is blown from a storage reel entirely into a container vessel of a fleeter, it is an object of the present invention to provide a pre-coiled cable which may be loaded directly into the containment vessel of the fleeter. To this end and as best illustrated in FIG. 13, the present invention provides a package 131 and a coil of cable 132 contained inside the package 131. The coil of cable 132 is not wound upon a reel. In a preferred embodiment, the package 131 is a box. Further, at least one fastener 133 is wrapped around a section of the coil of cable 132. In the depicted embodiment, first and second hook and loop fastener straps (aka, VELCRO straps) are wrapped around two sections of the coil of cable 132. However, the fasteners 133 may be of other types such as a twist tie wrap, tape, a tied strap, a tied string, a plastic ratcheting pull strap (aka, a ZIP TIE), and other similar devices.

In accordance with the present invention, a method of supplying a fleeter with cable includes opening the package 131, removing the coil of cable 132 from the package 131, cutting or removing one or more fasteners 133 wrapped around one or more sections of the coil of cable 132, directly inserting the coil of cable 132 into the fleeter, and pulling a free end of the coil of cable 132 to a feeder, e.g., a cable blowing machine, of the fleeter. The step of blowing the cable into the containment vessel of the fleeter, as done in the prior art, is avoided.

An alternative to the above method is to size the package 131 to fit into the containment vessel of the fleeter. The method then includes opening the package 131, cutting or releasing one or more fasteners 133 wrapped around one or more sections of the coil of cable 132 (if fasteners 133 are present), directly inserting the package 131 with the coil of cable 132 into the fleeter, and pulling a free end of the coil of cable 132 to a feeder, e.g., a cable blowing machine, of the fleeter. The step of blowing the cable into the containment vessel of the fleeter, as done in the prior art, is avoided. Also, it may be advantageous to make the package 131 transparent so that the deployment action of the coil of cable 132 out of the package 131 is visible to the technician to verify proper functioning of the fleeter.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

The invention claimed is:

1. A cable reel comprising:
   a central hub;
   a first flange located proximate one edge of said central hub;
   a second flange located proximate an opposite, second edge of said central hub;
   a third flange located between said first flange and said second flange, forming a first reel section between said first flange and said third flange, and forming a second reel section between said second flange and said third flange; and
   an over-the-flange guide, wherein said over-the-flange guide is removably connected to, and can move around, an outer periphery of said first flange.

2. The cable reel of claim 1, wherein an outer edge of said first flange includes a first track feature, and wherein said over-the-flange guide includes at least one roller which rolls along a surface proximate said outer periphery of said first flange and further includes at least one projecting feature which extends into said first track feature.

3. The cable reel of claim 2, wherein said first track feature is a first groove concentrically formed just inside an outer periphery of said first flange on a first side of said first flange and a second groove concentrically formed just inside said outer periphery of said first flange on a second side of said first flange, wherein said at least one roller includes first and second rollers engaging said first and second sides of said first flange, and wherein said at least one projecting feature includes first and second projecting features which extend into said first and second grooves.

4. The cable reel of claim 1, further comprising:
   a continuous communications cable having a first portion spooled on said first reel section and a second portion spooled on said second reel section.

5. The cable reel of claim 4, further comprising:
   a passageway formed in said third flange and a segment of said continuous cable passing through said passageway.

6. The cable reel of claim 5, wherein said passageway is formed as a slot extending from a portion of said third flange adjacent to said central hub to an opening in an outer periphery of said third flange.

7. The cable reel of claim 6, wherein said segment of said continuous cable is located proximate a mid-portion of a length of said continuous cable.

8. The cable reel of claim 4, wherein said over-the-flange guide includes at least one wheel over which said continuous communications cable passes.

9. The cable reel of claim 8, wherein said at least one wheel includes a first wheel facing to a second wheel, and wherein said continuous communications cable passes between said first and second wheels.

10. A cable reel comprising:
    a central hub;
    a first flange located proximate one edge of said central hub;
    a second flange located proximate an opposite, second edge of said central hub; and
    a third flange located between said first flange and said second flange, forming a first reel section between said first flange and said third flange, and forming a second reel section between said second flange and said third flange, wherein an outer edge of said first flange includes a first track feature, and wherein said first track feature is a first surface feature concentrically formed just inside an outer periphery of said first flange on a first side of said first flange and a second surface feature concentrically formed just inside said outer periphery of said first flange on a second side of said first flange.

11. The cable reel of claim 10, wherein an outer edge of said second flange includes a second track feature.

12. The cable reel of claim 11, wherein said second track feature is a third surface feature concentrically formed just inside an outer periphery of said second flange on a first side of said second flange and a fourth surface feature concentrically formed just inside said outer periphery of said second flange on a second side of said second flange.

13. The cable reel of claim 10, further comprising:
a continuous communications cable having a first portion spooled on said first reel section and a second portion spooled on said second reel section.

14. A cable reel comprising:
a central hub;
a first flange located proximate one edge of said central hub;
a second flange located proximate an opposite, second edge of said central hub;
a third flange located between said first flange and said second flange, forming a first reel section between said first flange and said third flange, and forming a second reel section between said second flange and said third flange; and
a passageway formed in said third flange and creating an opening between a first side of said third flange and a second side of said third flange, wherein a first side of said third flange includes a first bulbous curved portion, extending away from a plane of said first side of said third flange in a direction away from said second side of said third flange and being located adjacent to a first side edge of said passageway.

15. The cable reel of claim 14, wherein said second side of said third flange includes a second bulbous curved portion, extending away from a plane of said second side of said third flange in a direction away from said first side of said third flange and being located adjacent to a second side edge of said passageway.

16. The cable reel of claim 14, further comprising:
a continuous communications cable having a first portion spooled on said first reel section and a second portion spooled on said second reel section, wherein a segment of said continuous cable passes through said passageway.

17. The cable reel of claim 14, further comprising:
a second bulbous curved portion extending away from said plane of said first side of said third flange in a direction away from said second side of said third flange and being located adjacent to a second side edge of said passageway.

18. The cable reel of claim 17, further comprising:
a third bulbous curved portion extending away from a plane of said second side of said third flange in a direction away from said first side of said third flange and being located adjacent to said first side edge of said passageway.

19. The cable reel of claim 18, further comprising:
a fourth bulbous curved portion extending away from said plane of said second side of said third flange in a direction away from said first side of said third flange and being located adjacent to said second side edge of said passageway.

* * * * *